United States Patent
Kim et al.

(10) Patent No.: US 10,146,582 B2
(45) Date of Patent: Dec. 4, 2018

(54) METHOD FOR ASSIGNING PRIORITY TO MULTIPROCESSOR TASKS AND ELECTRONIC DEVICE SUPPORTING THE SAME

(71) Applicant: Samsung Electronics Co., Ltd., Gyeonggi-do (KR)

(72) Inventors: Joohwan Kim, Gyeonggi-do (KR); Dohyoung Kim, Gyeonggi-do (KR); Hyunjin Park, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 14/790,586

(22) Filed: Jul. 2, 2015

(65) Prior Publication Data
US 2016/0004569 A1   Jan. 7, 2016

(30) Foreign Application Priority Data
Jul. 2, 2014 (KR) .................. 10-2014-0082686

(51) Int. Cl.
*G06F 9/50* (2006.01)

(52) U.S. Cl.
CPC .... *G06F 9/5027* (2013.01); *G06F 2209/5021* (2013.01); *Y02B 60/142* (2013.01); *Y02D 10/22* (2018.01)

(58) Field of Classification Search
CPC ................................................ G06F 9/5038
See application file for complete search history.

(56) References Cited

U.S. PATENT DOCUMENTS

| | | | |
|---|---|---|---|
| 5,600,822 A | 2/1997 | Grice et al. | |
| 6,986,139 B1* | 1/2006 | Kubo | G06F 9/505 709/223 |
| 8,024,731 B1* | 9/2011 | Cornwell | G06F 9/4881 718/100 |
| 2003/0084088 A1* | 5/2003 | Shaffer | G06F 9/5044 718/104 |
| 2005/0013705 A1 | 1/2005 | Farkas et al. | |
| 2008/0127192 A1 | 5/2008 | Capps et al. | |
| 2008/0263324 A1 | 10/2008 | Sutardja et al. | |
| 2008/0313640 A1 | 12/2008 | Liu et al. | |
| 2009/0165014 A1* | 6/2009 | Park | G06F 9/5088 718/105 |
| 2011/0307903 A1 | 12/2011 | Vaddagiri | |
| 2012/0159507 A1* | 6/2012 | Kwon | G06F 9/5088 718/104 |

(Continued)

OTHER PUBLICATIONS

European Search Report dated Jan. 26, 2016 issued in counterpart application No. 15174999.1-1957, 9 pages.

*Primary Examiner* — Charlie Sun
(74) *Attorney, Agent, or Firm* — The Farrell Law Firm, P.C.

(57) ABSTRACT

A method for determining task priorities in an electronic device is provided. The method includes receiving, at the electronic device, a request to perform a task, identifying a threshold parameter and a weighted value in accordance with a type of the requested task, measuring the threshold parameter of the task based on the identified weighted value, and assigning the requested task to one of a first operational unit and a second operational unit based on the measured threshold parameter and weighted value.

17 Claims, 9 Drawing Sheets

(56) References Cited

U.S. PATENT DOCUMENTS

| | | | |
|---|---|---|---|
| 2012/0180061 A1* | 7/2012 | Rao | G06F 9/5088 |
| | | | 718/104 |
| 2012/0222036 A1* | 8/2012 | Yoshimura | H04N 1/0092 |
| | | | 718/103 |
| 2013/0024868 A1 | 1/2013 | Jeong et al. | |
| 2013/0232346 A1 | 9/2013 | Wu | |
| 2014/0173623 A1* | 6/2014 | Chang | G06F 9/5088 |
| | | | 718/105 |
| 2014/0181834 A1 | 6/2014 | Lim et al. | |
| 2015/0135183 A1* | 5/2015 | Kipp | G06F 9/46 |
| | | | 718/103 |

* cited by examiner

METHOD FOR ASSIGNING PRIORITY TO MULTIPROCESSOR TASKS AND ELECTRONIC DEVICE SUPPORTING THE SAME

PRIORITY

This application claims priority under 35 U.S.C. § 119(a) to Korean Patent Application Serial No. 10-2014-0082686, which was filed on Jul. 2, 2014, in the Korean Intellectual Property Office, the entire disclosure of which is incorporated herein by reference.

BACKGROUND OF THE INVENTION

1. Field of the Invention

The present invention relates generally to a method for assigning priority to tasks in a multiprocessor system environment, and more particularly, to an electronic device supporting a method in which load levels of tasks are computed based on weighted values assigned to groups for determining prioritization of the tasks.

2. Description of the Related Art

With recent advances in the processor technology, single-core processors have evolved into multi-core processors. A multi-core processor may execute multiple tasks at the same time. An electronic device that employs a multi-core processor has better performance than an electronic device that employs a single-core processor. A multi-core processor may have two or more cores, and each core may process at least one task. In an electronic device employing a multi-core processor, as at least one task can be processed by each core, multiple tasks can be efficiently processed at the same time.

In a multi-core processor, a task having a specific function may be assigned to a core or CPU. When a load of the core CPU becomes greater than or equal to a threshold load value, a task having been assigned to the core CPU may be re-assigned to another CPU having higher performance than the core CPU. However, in conventional multi-core processors, load levels of all tasks executed in a multi-core processor are typically computed using the same scheme. That is, as load levels of all tasks are computed with respect to the same criteria, a particular task may be unnecessarily assigned to a high-performance CPU for execution. Thus, conventional multi-core processor may unnecessarily consume electric current and experience performance degradation.

SUMMARY OF THE INVENTION

The present invention has been made to address at least the above mentioned problems and/or disadvantages and to provide at least the advantages described below. Accordingly, an aspect of the present invention is to provide an electronic device that can classify tasks into groups and assign weighted values to groups of tasks. That is, the present invention relates to a method and apparatus wherein load levels of tasks are computed based on the weighted values assigned to the groups so as to determine priorities of the tasks.

In accordance with an aspect of the present invention, there is provided a method for determining task priorities in an electronic device. The method includes receiving, at the electronic device, a request to perform a task, identifying a threshold parameter and a weighted value in accordance with a type of the requested task, measuring the threshold parameter of the task based on the identified weighted value, and assigning the requested task to one of a first operational unit and a second operational unit based on the measured threshold parameter and weighted value.

In accordance with an aspect of the present invention, there is provided an electronic device. The electronic device includes a task type determiner module configured to identify a type and a group of a task and determine a weighted value corresponding to the identified group, a threshold parameter setting module configured to identify a threshold parameter corresponding to the identified type of task, and a processor configured to process a request for a task, measure the threshold parameter of the task based on the weighted value identified through the task type determiner module and the threshold parameter setting module, and assign the requested task to one of a first operational unit and a second operational unit based on the measured threshold parameter and weighted value.

BRIEF DESCRIPTION OF THE DRAWINGS

The above and other aspects, features, and advantages of certain embodiments of the present invention will be more apparent from the following detailed description taken in conjunction with the accompanying drawings, in which.

DETAILED DESCRIPTION OF THE EMBODIMENTS OF THE PRESENT INVENTION

Figure 1:
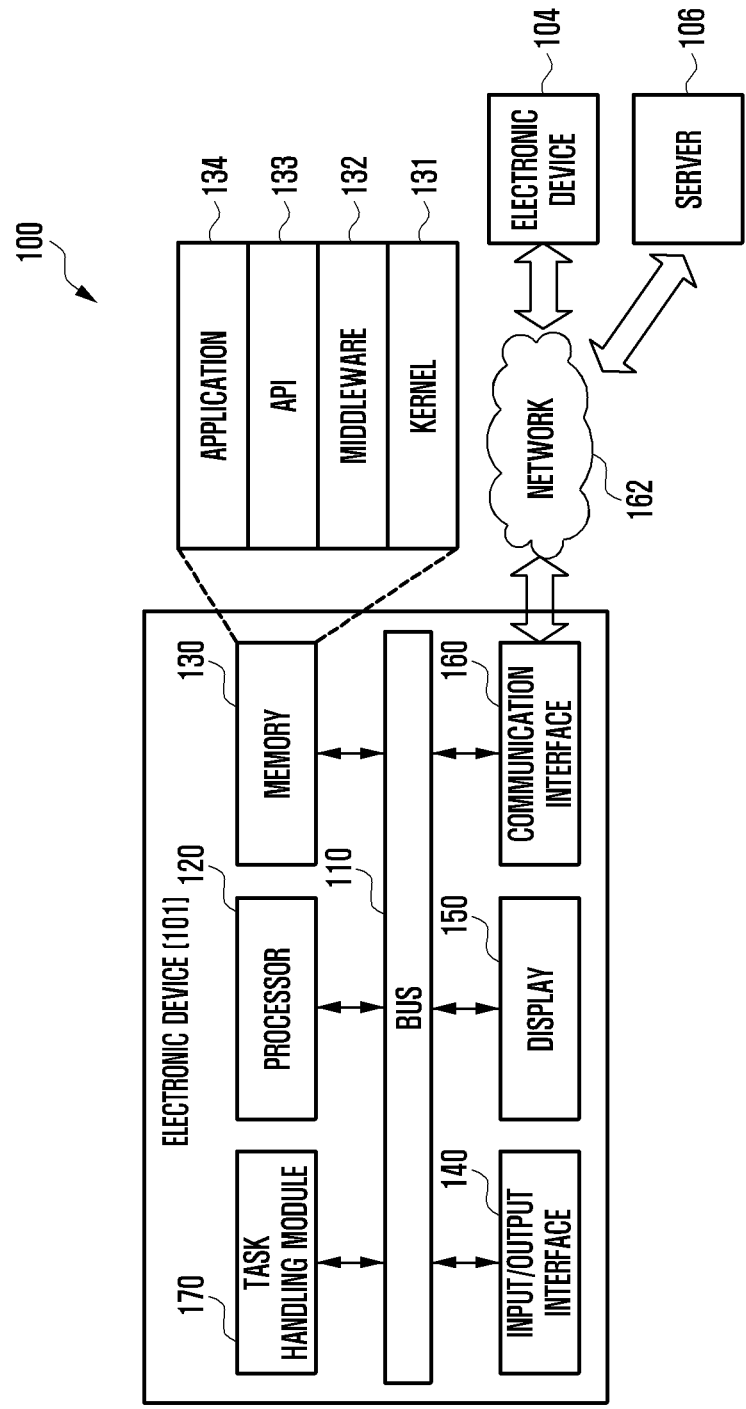
FIG. 1 is a diagram illustrating a network environment including multiple electronic devices, according to an embodiment of the present invention.

Hereinafter, embodiments of the present invention are described in detail with reference to the accompanying drawings. Those of ordinary skill in the art will recognize that various changes and modifications of the embodiments described herein can be made without departing from the scope of the present invention. In addition, descriptions of well-known functions and constructions may be omitted for clarity and conciseness. The same reference symbols are used throughout the drawings to refer to the same or like parts.

It should be noted that various embodiments described below may be applied or used individually or in combination.

It will be understood that the expressions "comprises" and "may comprise" is used to specify presence of disclosed function, operation, component, etc. but do not preclude the presence of one or more functions, operations, components, etc. It will be further understood that the terms "comprises"

and/or "has" when used in this specification, specify the presence of stated features, numbers, steps, operations components, elements, or a combination thereof but do not preclude the presence or addition of one or more other features, numbers, steps, operations, components, elements, or combinations thereof. In the present disclosure, the expression "and/or" is taken as specific disclosure of each and any combination of enumerated things. For example, A and/or B is to be taken as specific disclosure of each of A, B, and A and B.

As used herein, terms such as "first," "second," etc. are used to describe various components, however, it is obvious that the components should not be defined by these terms. For example, the terms do not restrict the order and/or importance of the corresponding components. The terms are used only for distinguishing one component from another component. For example, a first component may be referred to as a second component and likewise, a second component may also be referred to as a first component, without departing from the teachings of the present invention.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present.

The terminology used herein is for the purpose of describing particular embodiments only and is not intended to be limiting of the present invention. As used herein, the singular forms "a", "an" and "the" are intended to include the plural forms as well, unless the context clearly indicates otherwise.

The term "module" means, but is not limited to, a unit of one of software, hardware, and firmware or any combination thereof. The term "module" may be used interchangeably with the terms "unit," "logic," "logical block," "component," or "circuit." The term "module" may denote a smallest unit of component or a part thereof. The term "module" may be the smallest unit of performing at least one function or a part thereof. A module may be implemented mechanically or electronically. For example, a module may include at least one of Application-Specific Integrated Circuit (ASIC) chip, Field-Programmable Gate Arrays (FPGAs), and Programmable-Logic Device known or to be developed for certain operations.

Unless otherwise defined herein, all terms including technical or scientific terms used herein have the same meanings as commonly understood by those skilled in the art to which the present invention relates. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein.

The electronic device described herein may include devices having an operation support function. Examples of the electronic device may include, but are not limited to, a smartphone, a table Personal Computer (PC), a mobile phone, a video phone, an electronic book (e-book) reader, a desktop PC, a laptop PC, a netbook computer, a Personal Digital Assistant (PDA), a Portable Multimedia Player (PMP), an MP3 player, a mobile medical appliance, a camera, wearable device (e.g. head-mounted device (HMD) such as electronic glasses, electronic clothing, electronic bracelet, electronic necklace, electronic appcessory, electronic tattoo, smartwatch, etc.)

The electronic device may be one of smart home appliances having operation support function. Examples of the smart home appliance may include, but is not limited to, a television, a Digital Video Disk (DVD) player, an audio player, a refrigerator, an air-conditioner, a vacuum cleaner, an electronic oven, a microwave oven, a laundry machine, an air cleaner, a set-to box, TV box (e.g. Samsung HomeSync®, apple TV®, and google TV®), a game console, an electronic dictionary, an electronic key, a camcorder, an electronic frame, etc.

Examples of the electronic device may include, but is not limited to, a medical device (e.g. Magnetic Resonance Angiography (MRA), a Magnetic Resonance Imaging (MRI), a Computed Tomography (CT)), a Navigation device, a Global Positioning System (GPS) receiver, an Event Data Recorder (EDR), a Flight Data Recorder (FDR), a car infotainment device, a maritime electronic device (e.g. maritime navigation device and gyro compass), an aviation electronic device (avionics), a security device, a vehicle head unit, an industrial or home robot, an Automatic Teller's Machine (ATM) of financial institution, a Point Of Sales (POS), etc.

Examples of the electronic device may include, but is not limited to, furniture and building/structure having a communication function, an electronic board, an electronic signature receiving device, a projector, and a metering device (e.g. water, electric, gas, and electric wave metering devices). The electronic device may be any combination of the aforementioned devices. The electronic device may be a flexible device. It will be obvious to those skilled in the art that the electronic device is not limited to the aforementioned devices.

The electronic device may include a heterogeneous multi-core processor having at least two cores of different types. The multi-core processor may be composed of different operational units such as X86, X64, ARM, GPU and DSP.

A "processor" includes at least one core and may be defined as an independent entity capable of cooperating with other components of the device.

An "operational unit" may be defined as a minimum entity that can interpret and execute instructions in a processor and may be used interchangeably with a "core".

In the following description, the "user" may refer to a person utilizing an electronic device or to an appliance utilizing an electronic device (e.g. artificial intelligence appliance).

In accordance with the present invention, a method for assigning priority to multiprocessor tasks is herein described. The method enables an electronic device to identify a type of a task and a group to which the task belongs and to determine a priority of the task based on weighted values assigned to the groups of tasks. As weighted values are assigned to the groups and the priority of a task is determined based on the weighted values of the group to which the task belongs, the electronic device may effectively utilize electric current and perform efficient scheduling.

FIG. 1 is a diagram illustrating a network environment 100 including multiple electronic devices, according to an embodiment of the present invention.

Referring to FIG. 1, an electronic device 101 includes a bus 110, a processor 120, a memory 130, an input/output interface 140, a display 150, a communication interface 160, and a task handling module 170.

The bus 110 may be a circuit interconnecting the above components for intercommunication therebetween (e.g. exchange of control messages).

The processor 120 receives instructions from other components (e.g. memory 130, input/output interface 140, display 150, communication interface 160 and task handling module 170) through the bus 110, decodes the instructions, and performs operations or data processing according to the decoded instructions.

The processor 120 may be a multi-core processor. Such a multi-core processor may include at least one high-performance big core (e.g. Cortex-A15 core) and at least one low-power little core (e.g. Cortex-A7 core). In addition, the processor 120 may include a first operational unit composed of high-performance big cores, and a second operational unit composed of low-power little cores.

The memory 130 stores a command or data received from the processor 120 or other components (e.g. input/output interface 140, display 150, communication interface 160, operation module 170, etc.) or generated by the processor 120 or other components. The memory 130 stores program modules including a kernel 131, a middleware 132, an Application Programming Interface (API) 133, applications 134, etc. Each programming module may be implemented as software, firmware, hardware, and/or any combination thereof.

The kernel 131 controls or manages the system resources (e.g. bus 110, processor 120, and memory 130) for use in executing an operation or function implemented with the middleware 132, the API 133, or the application 134. The kernel 131 also provides an interface thereby allowing the middleware 132, API 133, or application 134 to access the components of the electronic device 101 to control or manage the electronic device 101.

The middleware 132 may work as a relay of data communicated between the API 133 or application 134 and the kernel 131. The middle 132 executes control of task requests from the applications 134 by assigning priority to the tasks for use of the system resource (e.g. bus 110, processor 120, and memory 130) of the electronic device to at least one of the applications 134.

The API 133 is an interface for the applications 134 to control the function provided by the kernel 131 or the middleware 132 and may include at least one interface or function (e.g. command) for file control, window control, image control, or text control.

The application 134 may include a Short Message Service (SMS)/Multimedia Message Service (MMS) application, an e-mail application, a calendar application, an alarm application, a health care application (e.g., an application for measuring an amount of exercise or blood sugar), and an environmental information application (e.g., an application for providing an atmospheric pressure, humidity, temperature, and the like). The application 134 may include an application related to an information exchange between the electronic device 101 and an external electronic device (e.g., an electronic device 104). The application related to the information exchange may include, for example, a notification relay application for transferring particular information to the external electronic device or a device management application for managing the external electronic device.

For example, the notification relay application may include a function of transferring, to the external electronic device (e.g., the electronic device 104), notification information generated from other applications of the electronic device 101 (e.g., an SMS/MMS application, an e-mail application, a health management application, an environmental information application, and the like). The notification relay application receives notification information from, for example, the external electronic device (e.g., the electronic device 104) and provides the received notification information to a user. For example, the device management application manages (e.g., installs, deletes, or updates) functions for at least a part of an external electronic device (e.g., the electronic device 104) communicating with the electronic device 101 (e.g., turning on/off the external electronic device itself (or some elements thereof) or adjusting brightness (or resolution) of a display), applications operating in the external electronic device, or services (e.g., a telephone call service or a message service) provided from the external electronic device.

The application 134 may include an application designated according to an attribute (e.g., a type of the electrode device) of the external electronic device. For example, when the external electronic device is an MP3 player, the application 134 may include an application related to the reproduction of music. Similarly, in the case where the external electronic device is a mobile medical appliance, the application 134 may include an application related to health care. The application 134 may include at least one of an application designated to the electronic device 101 and an application received from the external electronic device (e.g., a server 106 or the electronic device 104).

The input/output interface 140 transfers instructions or data input from a user through an input/output device (e.g., a sensor, a keyboard, or a touch screen) to, for example, the processor 120, the memory 130, the communication interface 160, or the task handling module 170 through the bus 110. For example, the input/output interface 140 provides, to the processor 120, data for a user's touch input through the touch screen. Further, the input/output interface 140 outputs, for example, an instruction or data received through the bus 110 from the processor 120, the memory 130, the communication interface 160, and the task handling module 170, through an input/output device (e.g., a speaker or display). For example, the input/output interface 140 outputs voice data processed through the processor 120 to the user through the speaker.

The display 150 displays various pieces of information (e.g., multimedia data or text data) to a user.

The communication interface 160 provides an interface for communication between the electronic device 101 and the external electronic device 104 or the server 106. For example, the communication interface 160 communicates with the external device while being connected to a network 162 through wireless communication or wired communication. The wireless communication may include at least one of, for example, Wi-Fi (Wireless Fidelity), Bluetooth® (BT), Near Field Communication (NFC), GPS and cellular communication (e.g., Long Term Evolution (LTE), LTE-A, Code Division Multiple Access (CDMA), Wideband CDMA (WCDMA), Universal Mobile Telecommunication System (UMTS), Wireless Broadband (WiBro), and Global System for Mobile communication (GSM)). The wired communication may include at least one of, for example, a Universal Serial Bus (USB), a High Definition Multimedia Interface (HDMI), Recommended Standard 232 (RS-232), and a Plain Old Telephone Service (POTS).

The network 162 may be a communication network. The communication network may include at least one of a computer network, the Internet, the Internet of things, and a telephone network. A protocol (e.g., a transport layer protocol, data link layer protocol, or a physical layer protocol) for communication between the electronic device 101 and the external device may be supported by at least one of the application 134, the application programming interface 133, the middleware 132, the kernel 131, and the communication interface 160.

The task handling module 170 may be a module that manages the processing order and execution of tasks of the electronic device 101 for efficient task processing thereof. A task may refer to an executable job with a separate program section (e.g. code and stack).

Figure 2:
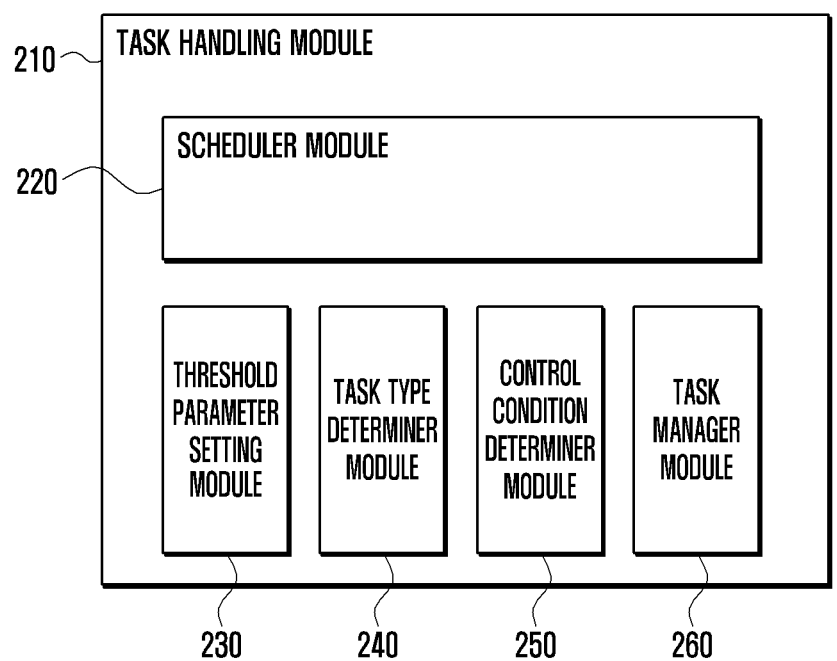
FIG. 2 is a block diagram illustrating a task handling module in an electronic device, according to an embodiment of the present invention.

FIG. 2 is a block diagram illustrating a task handling module 210 in an electronic device (e.g. electronic device 101), according to an embodiment of the present invention.

Referring to FIG. 2, the task handling module 210 (e.g. task handling module 170 in FIG. 1) includes a scheduler module 220, a threshold parameter setting module 230, a task type determiner module 240, a control condition determiner module 250, and a task manager module 260.

The scheduler module 220 controls the threshold parameter setting module 230, task type determiner module 240, control condition determiner module 250, and task manager module 260 to achieve efficient task scheduling of the electronic device 101. For example, the scheduler module 220 assigns a task to one of the first operational unit (including multiple high-performance big cores (e.g. Cortex-A15)) and the second operational unit (including multiple low-power little cores (e.g. Cortex-A7)) for execution according to a workload and priority of the assigned task. That is, the scheduler module 220 selects a core (e.g. from among cores of the first operational unit and second operational unit) and assigns a task to the selected core. The scheduler module 220 determines the priority of the task for scheduling. The scheduler module 220 may migrate an assigned task to one of the cores of the first operational unit and the second operational units based on the priority of the task.

When a performance control condition is generated in relation to a task assigned to an operational unit, the scheduler module 220 may migrate the task from the operational unit to another operational unit according to a preset rule. Task migration may refer to an activity of moving dynamic and static data of a task to a different memory or processor so that the task may continue its execution after movement of the task to a designated one of the cores. For example, the scheduler module 220 may deactivate the core (source core) to which the task to be migrated is assigned, activate another core (target core), and migrating the task from the source core to the target core.

When a performance control condition is generated in a running task or obtained task, the scheduler module 220 assigns the task related with the performance control condition to the first operational unit or migrates the task being processed by the second operational unit to the first operational unit. The scheduler module 220 assigns the task related with the performance control condition to the second operational unit or migrates the task being processed by the first operational unit to the second operational unit.

A performance control condition may be related to a change in task load or an event occurring at a specific situation or time. Examples of a change in task load may include, but is not limited to, the load of a task exceeding or falling below a threshold level, and the slope of the load deviating from a preset slope. Examples of an event occurrence may include, but is not limited to, booting of the operating system, detection of a touch input, initiation of application execution, loading of a website, downloading or uploading of content, remaining battery power falling below a threshold, wired or wireless data transmission, switching between a foreground and background on a screen of the electronic device 101, a screen update, and a turning on or off of the display (e.g. LCD), or a combination thereof.

The threshold parameter setting module 230 configures different threshold parameters for migration according to task types. The threshold parameter setting module 230 may include a database to manage threshold parameters for tasks. The threshold parameter database may include tables which can be composed of sets of threshold parameters applicable to individual task types. Threshold parameters may include, but is not limited to, up-level and down-level values for the load, load slope, and an operating frequency of a task, and may further include other parameters affecting task behaviors, if necessary. The up-level value may be a threshold value for migration from the first operational unit to the second operational unit (e.g. a downward migration), and the down-level value may be a threshold value for migration from the second operational unit to the first operational unit (e.g. an upward migration). The up-level and down-level values may differ from each other and may be set differently according to task types.

The threshold parameter setting module 230 receives task type information from the task type determiner module 240 and identifies the threshold parameters corresponding to the task type based on the threshold parameter database. The threshold parameter setting module 230 delivers the identified threshold parameters to the scheduler module 220 and the control condition determiner module 250, so that the threshold parameters are enforced according to the task type. Although the threshold parameters are described with respect to the load of tasks, the present invention is not limited thereto.

The task type determiner module 240 determines a type of an obtained task or a task at which a performance control condition is generated based on task information. The task type determiner module 240 notifies the threshold parameter setting module 230 and the control condition determiner module 250 of the determined task type.

Tasks may be classified into various types (e.g. type 1, type 2, . . . , type N) according to characteristics, classes or behaviors of the tasks. Task types may be represented as a hierarchical class structure or a one class structure. Task types may be defined in terms of an individual task, a group of tasks, a characteristic of a task and/or a behavior of a task. For example, task types may be defined in terms of a workload of a task, an amount of data of a task, a response time of a task, and a runtime of a task. Task types may also be defined according to application classes or behavioral events.

The task type determiner module 240 selectively classifies tasks into groups corresponding to task types. For example, when type 1 and type 2 of tasks are defined, the task type determiner module 240 classifies tasks into groups corresponding respectively to type 1 and type 2. The task type determiner module 240 determines a type of an assigned task or a task at which a performance control condition is generated by determining whether the task is of type 1 or of type 2 based on the task information.

The control condition determiner module 250 determines whether a performance control condition is generated in relation to a task. Upon determining that a performance control condition is generated, the control condition determiner module 250 notifies the scheduler module 220 of the generation of the performance control condition. To detect a task state change, the control condition determiner module 250 monitors the task manager module 260 and other components (e.g. input interface or power control unit) of the electronic device 101.

The control condition determiner module 250 determines whether a task load change is generated (e.g. the load of a task exceeds or falls below a threshold level, or the slope of the load deviates from a preset slope).

The control condition determiner module 250 determines whether a specific event is generated (e.g. a booting of the operating system, a detection of a touch input, an initiation of application execution, a loading of a website, a downloading or uploading of content, a remaining battery power falling below a threshold, a wired or wireless data transmission, a switching between the foreground and background of a screen of the electronic device, a screen update, or a turning on or off of the display).

When a performance control condition is generated in relation to a task, the control condition determiner module 250 delivers information relating to the performance control condition to the scheduler module 220. The control condition determiner module 250 may be configured to measure the load of a task. The control condition determiner module 250 identifies the type and group of a task and measures the load of the task based on a weighted value assigned to the group. Here, the weighted values may be numerical values assigned to the individual groups and may be used to measure the load of tasks. For example, the weighted values may be set according to a preference of a designer (or a manufacturer) of the electronic device 101 or may be set in proportion to a CPU workload caused by the executed tasks. Alternatively, as a lower nice value means a high priority, the weighted values may be set according to nice values of tasks. The control condition determiner module 250 measures the load level value of a task based on the weighted values given to a group or groups of tasks and delivers the measured load level value of the task to the scheduler module 220. In other words, the control condition determiner module 250 determines whether a performance control condition is generated based on the load level of weighted values of tasks.

The task manager module 260 obtains, removes or changes a task according to a user request or a preset schedule. The task manager module 260 monitors operations of the first operational unit and the second operational unit, which are executing tasks, and stores the monitored information in a database. For example, when the user issues an execution request for an application function in the electronic device, the task manager module 260 obtains a task corresponding to the application function and sends the task information to the scheduler module 220.

The task manager module 260 determines priorities of tasks based on the load levels or weighted values of the tasks obtained by the control condition determiner module 250. Here, the priorities of tasks may be priorities for executing the tasks.

In accordance with a method of the present invention, for assigning a priority to tasks, the scheduler module 220 determines whether a task is to be executed on the first operational unit or on the second operational unit based on the threshold parameters set by the threshold parameter setting module 230. The scheduler module 220 identifies the type and group of the task using the task type determiner module 240. That is, the scheduler module 220 identifies a weighted value given to the group and enforces the threshold parameters according to the identified weighted value. For example, the scheduler module 220 identifies the load level and weighted value of the task using the control condition determiner module 250. The scheduler module 220 controls the task manager module 260 to determine priorities of tasks based on the load levels and weighted values. The scheduler module 220 performs task scheduling based on the determined priorities of tasks.

Figure 3:
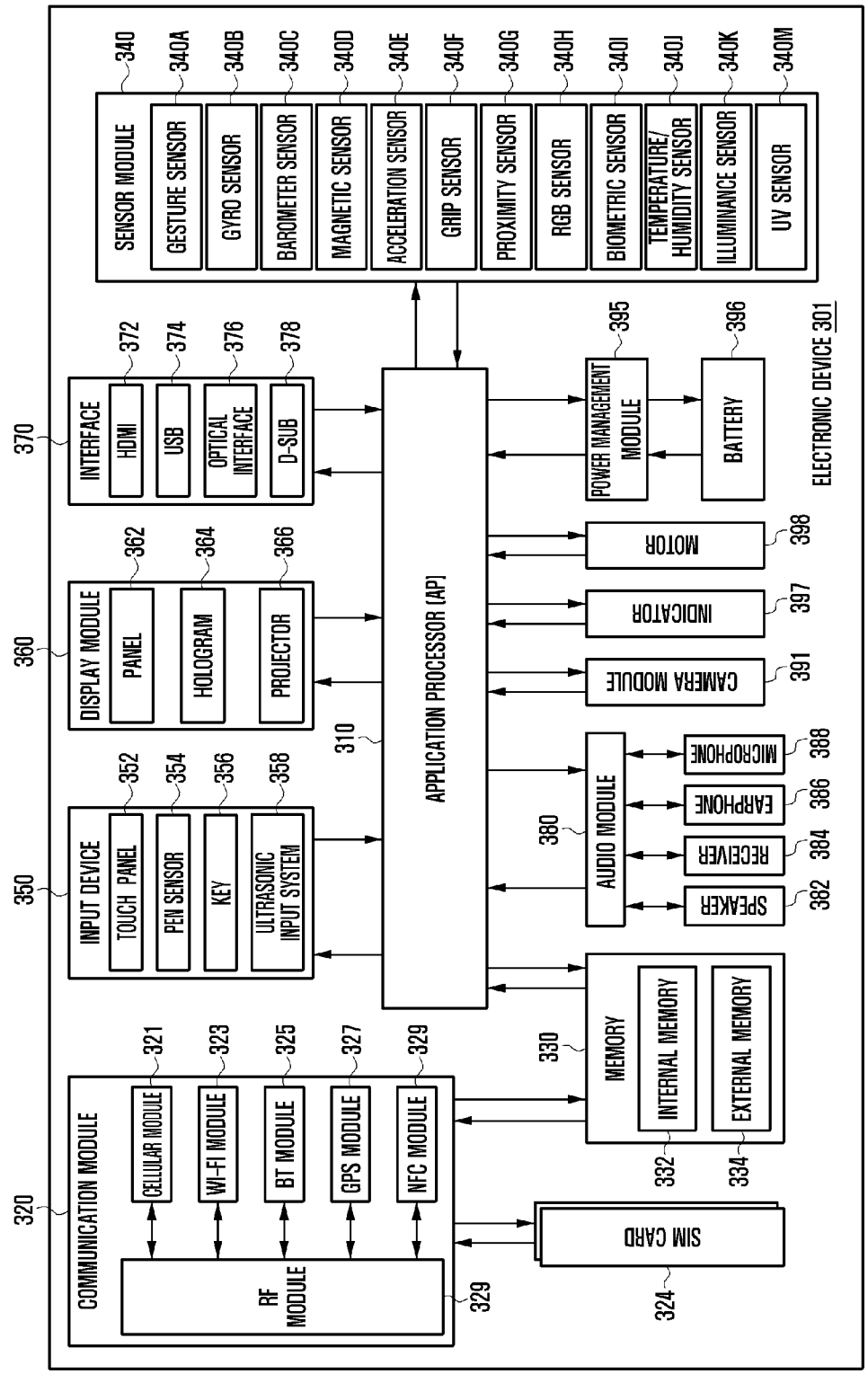
FIG. 3 is a block diagram illustrating an electronic device, according to an embodiment of the present invention.

FIG. 3 is a block diagram illustrating a configuration of an electronic device 301, according to an embodiment of the present invention. The electronic device 301 may include all or some of the parts of the electronic device 101.

Referring to FIG. 3, the electronic device 301 includes an Application Processor (AP) 310, a communication module 320, a Subscriber Identity Module (SIM) card 324, a memory 330, a sensor module 340, an input device 350, a display 360, an interface 370, an audio module 380, a camera module 391, a power management module 395, a battery 396, an indicator 397, and a motor 398.

The AP 310 operates an Operating System (OS) and/or application programs to control a plurality of hardware and/or software components connected to the AP 310 and performs data-processing and operations on multimedia data. For example, the AP 310 may be implemented in the form of a System on Chip (SoC). The AP 310 may include a Graphic Processing Unit (GPU).

The communication module 320 (e.g. communication interface 160) performs data communication with other electronic devices (e.g. electronic device 104 and server 106) through a network (e.g., the network 162). The communication module 320 includes a cellular module 321, a Wi-Fi module 323, a BT module 325, a GPS module 327, an NFC module 328, and a Radio Frequency (RF) module 329.

The cellular module 321 is responsible for voice and video communication, text messaging, and Internet access services through a communication network (e.g. LTE, LTE-A, CDMA, WCDMA, UMTS, WiBro, and GSM networks). The cellular module 321 performs identification and authentication of electronic devices in the communication network using the SIM card 324. The cellular module 321 performs at least one of the functions of the AP 310. For example, the cellular module 321 performs at least a part of the multimedia control function.

The cellular module 321 may include a Communication Processor (CP). The cellular module 321 may be implemented in the form of SOC. Although the cellular module 321 (e.g. communication processor), the memory 330, and the power management module 395 are depicted as independent components separated from the AP 310, the present invention is not limited thereto but may be embodied in a way that the AP includes at least one of the components (e.g. cellular module 321).

Each of the AP 310 and the cellular module 321 (e.g. communication processor) loads a command or data received from at least one of the components on a non-volatile or volatile memory and process the command or data. The AP 310 or the cellular module 321 stores the data received from other components or generated by at least one of other components in the non-volatile memory.

Each of the Wi-Fi module 323, the BT module 325, the GPS module 327, and the NFC module 328 may include a processor for processing the data it transmits/receives. Although the cellular module 321, the Wi-Fi module 323, the BT module 325, the GPS module 327, and the NFC module 328 are depicted as independent blocks, at least two of them (e.g. communication processor corresponding to the cellular module 321 and Wi-Fi processor corresponding to the Wi-Fi module 323) may be integrated in the form of SoC.

The RF module 329 is responsible for data communication, e.g. transmitting/receiving RF signals. Although not depicted, the RF module 329 may include a transceiver, a Power Amp Module (PAM), a frequency filter, and a Low Noise Amplifier (LNA). The RF module 329 also may include the elements for transmitting/receiving electric wave in free space, e.g. conductor or conductive wire. Although FIG. 3 is directed to the case where the Wi-Fi module 323, the BT module 325, the GPS module 327, and the NFC module 328 are sharing the RF module 329, the present invention is not limited thereto but may be embodied in a way that at least one of the Wi-Fi module 323, the BT module 325, the GPS module 327, and the NFC module 328 transmits/receives RF signals an independent RF module.

The SIM card 324 may be designed so as to be inserted into a slot formed at a predetermined position of the electronic device 301. The SIM card 324 stores unique identity information (e.g. Integrated Circuit Card Identifier (ICCID)) or subscriber information (e.g. International Mobile Subscriber Identity (IMSI)).

The memory 330 (e.g. memory 130) includes at least one of the internal memory 332 and an external memory 334. The internal memory 332 includes at least one of a volatile memory (e.g. Dynamic Random Access Memory (DRAM), Static RAM (SRAM), Synchronous Dynamic RAM (SDRAM) or a non-volatile memory (e.g. One Time Programmable Read Only Memory (OTPROM), Programmable ROM (PROM), Erasable and Programmable ROM (EPROM), Electrically Erasable and Programmable ROM (EEPROM), mask ROM, flash ROM, NAND flash memory, and NOR flash memory).

The internal memory 332 may be a Solid State Drive (SSD). The external memory 334 may be a flash drive such as Compact Flash (CF), Secure Digital (SD), micro-SD, Mini-SD, extreme Digital (xD), and Memory Stick. The external memory 334 may be connected to the electronic device 301 through various interfaces. The electronic device 301 may include a storage device (or storage medium) such as hard drive.

The sensor module 340 checks the operation status of the electronic device 301 and converts the measured or checked information to an electric signal. The sensor module 340 includes at least one of gesture sensor 340A, gyro sensor 340B, barometric sensor 340C, magnetic sensor 340D, acceleration sensor 340E, grip sensor 340F, proximity sensor 340G, color sensor 340H (e.g. Red, Green, Blue (RGB) sensor), bio sensor 340I, temperature/humidity sensor 340J, illuminance sensor 340K, and Ultra Violet (UV) sensor 340M. The sensor module 340 may include E-nose sensor, Electromyography (EMG) sensor, Electroencephalogram (EEG) sensor, Electrocardiogram (ECG) sensor, Infrared (IR) sensor, iris sensor, and fingerprint sensor. The sensor module 340 may further include a control circuit for controlling at least one of the sensors included therein.

The input device 350 includes a touch panel 352, a pen sensor 354 (e.g., a digital pen sensor), keys 356, and an ultrasonic input device 358. The touch panel 352 may be one of a capacitive, a resistive, an infrared, or a microwave type touch panel. The touch panel 352 may include a control circuit. In the case of the capacitive type touch panel, it is possible to detect physical contact or proximity of an input device relative to the touch panel. The touch panel 352 may further include a tactile layer. In this case, the touch panel 352 may provide the user with haptic reaction.

The pen sensor 354 may be implemented with a sheet with the same or similar way as a touch input of the user or a separate recognition sheet. The keys 356 may include physical buttons, optical key, and keypad.

The ultrasonic input device 358 is a device capable of checking data by detecting sound wave through a microphone 388 and may be implemented for wireless recognition. The electronic device 301 receives a user input generated using an external device (e.g. computer or server) connected through the communication module 320.

The display 360 (e.g. display module 150) includes a panel 362, a hologram device 364, and a projector 366. The panel 362 may be a Liquid Crystal Display (LCD) panel or an Active Matrix Organic Light Emitting Diodes (AMOLED) panel. The panel 362 may be implemented so as to be flexible, transparent, and/or wearable. The panel 362 may be implemented as a module integrated with the touch panel 352. The hologram device 364 may project a 3-dimensional image in the air using interference of light. The projector 366 may project an image to a screen. The screen may be placed inside or outside the electronic device 301. The display 360 may include a control circuit for controlling the panel 362, the hologram device 364, and the projector 366.

The interface 370 includes a High-Definition Multimedia Interface (HDMI) 372, a Universal Serial Bus (USB) 374, an optical interface 376, and a D-subminiature (D-sub) 378. The interface 370 may include the communication interface 160 as shown in FIG. 1. Additionally or alternatively, the interface 370 may include a Mobile High-definition Link (MHL) interface, a SD/MMC card interface, and infrared Data Association (irDA) standard interface.

The audio module 380 converts sound to electric signals and vice versa. At least a part of the audio module 380 may be included in the input/output interface 140, as shown in FIG. 1. The audio module 380 processes the audio information input or output through the speaker 382, the receiver 384, the earphone 386, and the microphone 388.

The camera module 391 is a device capable of taking still and/or motion pictures and includes at least one image sensor (e.g. front and rear sensors), a lens, and Image Signal Processor (ISP), and a flash (e.g. LED or xenon lamp).

The power management module 395 manages the power of the electronic device 301. Although not shown, the power management module 395 may include a Power Management Integrated Circuit (PMIC), a charger Integrated Circuit (IC), a battery, and a battery gauge.

The PMIC may be integrated into an integrated circuit or SoC semiconductor. The charging may be classified into wireless charging and wired charge. The charger IC may charge the battery and protect the charger against overvoltage or overcurrent. The charger IC may include at least one of wired charger and wireless charger ICs. Examples of the wireless charging technology includes resonance wireless charging and electromagnetic wave wireless charging.

The battery gauge measures the residual power, charging voltage, current, and temperature of the battery 396. The battery 396 stores or generates power and supplies the stored or generated power to the electronic device 301. The battery 396 may include a rechargeable battery or a solar battery.

The indicator 397 displays operation status, booting status, messaging status, and charging status of the electronic device 301 or a part thereof. The motor 398 converts the electronic signal to mechanical vibration. Although not shown, the electronic device 301 may include a processing unit (e.g. GPU) for supporting mobile TV. The processing unit for supporting the mobile TV may be able to process the media data abiding by the broadcast standards, such as Digital Multimedia Broadcasting (DMB), Digital Video Broadcasting (DVB), and media flow.

The above enumerated components of the electronic device 301 of the present invention may be implemented into one or more parts, and the names of the corresponding components may be changed depending on the kind of the electronic device. The electronic device 301 may include at least one of the aforementioned components with omission or addition of some components. The components of the electronic device 301 may be combined selectively into an entity to perform the functions of the components equally as before the combination.

Figure 4:
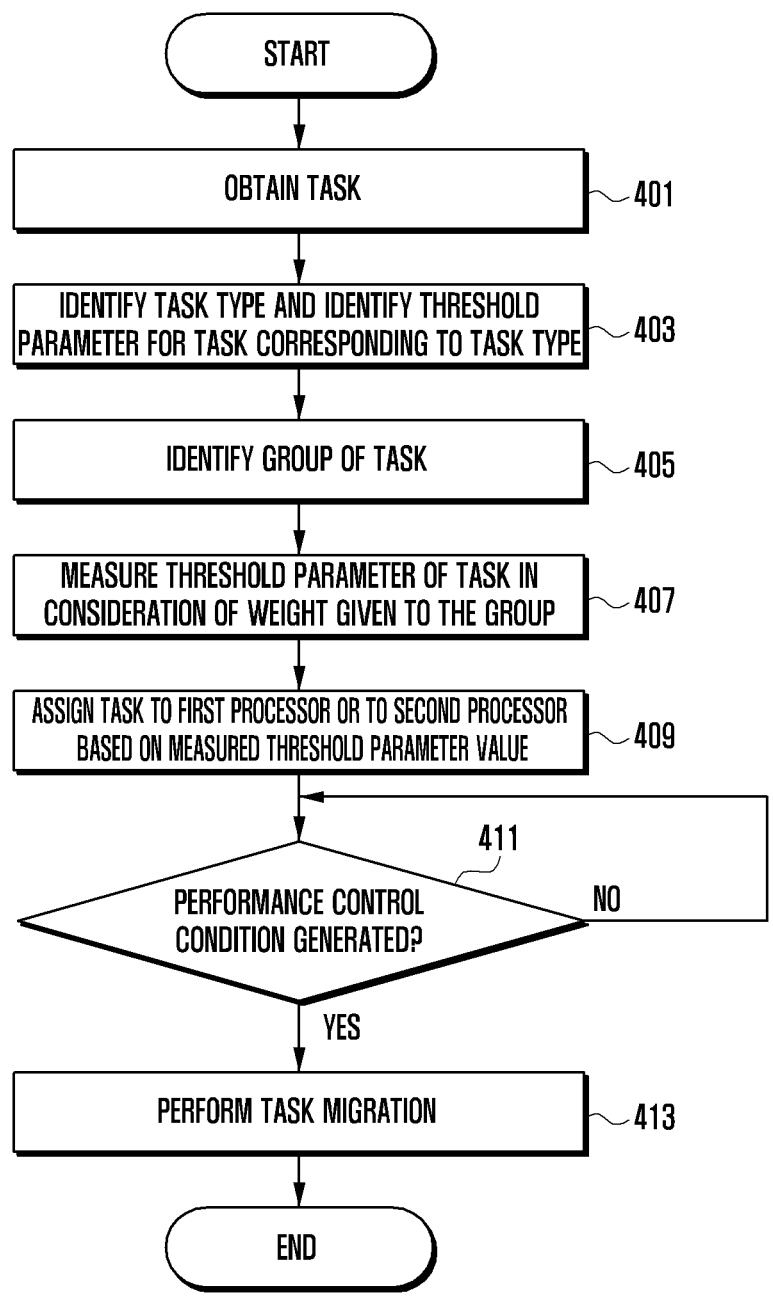
FIG. 4 is a flowchart illustrating a method for determining a priority of a task, according to an embodiment of the present invention.

FIG. 4 is a flowchart illustrating a method for determining the priority of a task, according to an embodiment of the present invention.

Referring to FIG. 4, at step 401, the processor 120 of the electronic device 101 (or the electronic device 301) obtains a task (i.e., receives a request to perform a task) according to a user request or preset schedule. For example, when the operating system of the electronic device 101 boots upon powering up the electronic device 101, the processor 120 obtains a task corresponding to a routine initiated at the boot time. The processor 120 also obtains a task in relation to a function of an application executed by the user. At step 403, the processor 120 controls the scheduler module 220 of the task handling module 170 (e.g. task handling module 210 in FIG. 2). Specifically, the processor 120 may control the task type determiner module 240 to identify the type of the task via the scheduler module 220. That is, the processor 120 identifies the threshold parameter for the task based on the task type at step 403. For example, when the task load level is set as the threshold parameter, the processor 120 identifies the up-level and down-level values for the load level of the task. At step 405, the processor 120 controls the task type determiner module 240 to identify the group to which the task belongs. Tasks may be classified into groups according to various criteria, and numerical weighted values may be assigned to the groups. Such weighted values may be preset according to a preference of a designer (or manufacturer) or may be set in proportion to the CPU workload caused by various tasks. At step 407, the processor 120 measures the threshold parameter (e.g. a load level) of the task in consideration of the weighted value given to a particular group or groups. That is, the processor 120 obtains the weighted value corresponding to the group of the task from the task type determiner module 240 and controls the task handling module 170 to measure the threshold parameter of the task based on the weighted value. At step 409, the processor 120 assigns the task to the first operational unit or to the second operational unit based on the measured threshold parameter value. That is, the processor 120 controls the task manager module 260 to perform task assignment separately for the first operational unit and the second operational unit. After task assignment, at step 411, the processor 120 checks whether a performance control condition is generated. If a performance control condition is generated, at step 413, the processor 120 performs task migration. For example, when a performance control condition is generated in relation to a task assigned to the first operational unit, the task may be migrated to the second operational unit. Alternatively, when a performance control condition is generated in relation to a task assigned to the second operational unit, the task may be migrated to the first operational unit. Accordingly, the processor 120 of the electronic device 101 identifies the type and group of an obtained task, determines the priority of the task based on the weighted value given to the group, and efficiently schedules the task according to the determined priority. Hence, the electronic device 101 may efficiently utilize electric current.

Figure 5A:
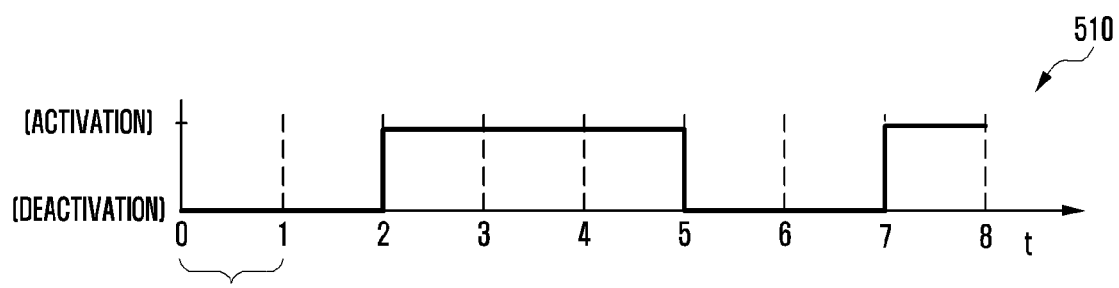
FIGS. 5A and 5B are graphs illustrating measurements of task load levels, according to an embodiment of the present invention.
Figure 5B:
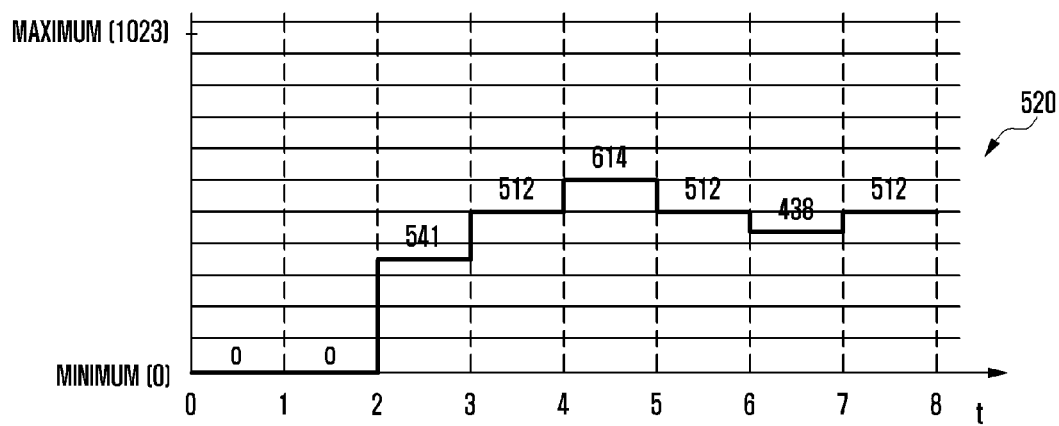

FIGS. 5A and 5B are graphs illustrating measurements of task load levels, according to an embodiment of the present invention.

In FIG. 5A, a task status graph 510 indicates points in time when a task is active (e.g. runnable or running) and is inactive (waiting or blocked), and in FIG. 5B, a task load graph 520 indicates the load level of a task with respect to the task status graph 510.

$$t = 8, \quad (1)$$
$$\text{load} = 1024 \left( \frac{\text{Total time in runnable, running states}}{\text{Total time in all states}} \right) = 1024 \left( \frac{4096}{8192} \right) = 512$$

Equation (1) above may be used to measure the load level of a task. In FIGS. 5A and 5B, when the time step is 1 second in the horizontal axis, the graphs depict task behaviors for 8 seconds. That is, Equation (1) computes the load level of the task at the time of 8 seconds. When Equation (1) is used to measure a task load level, the processor 120 obtains load values of all tasks in a uniform manner. In this case, as the processor 120 is unable to distinguish a task with a high priority from a task with a low priority, tasks with a low priority may be assigned to high-performance cores. This may cause the processor 120 to consume unnecessary power, lowering task processing efficiency.

The electronic device 101 identifies the group of a task and determines the priority of the task by applying the weighted value given to the group to the load level of the task. For example, the threshold parameter corresponding to the group may be set as the load level of the task. The processor 120 of the electronic device 101 obtains a load level and a weighted value for the task by combining the weighted value given to the group and the computed load level of the task. The processor 120 assigns a task whose weighted value and load level is greater than a threshold load level value to a high-performance big core. Here, use of task load level as the threshold parameter is for illustrative purposes, and other performance criteria may be used as the threshold parameter. As different weighted values are assigned to different task groups, task scheduling may be efficiently performed in the electronic device 101.

Figure 6:
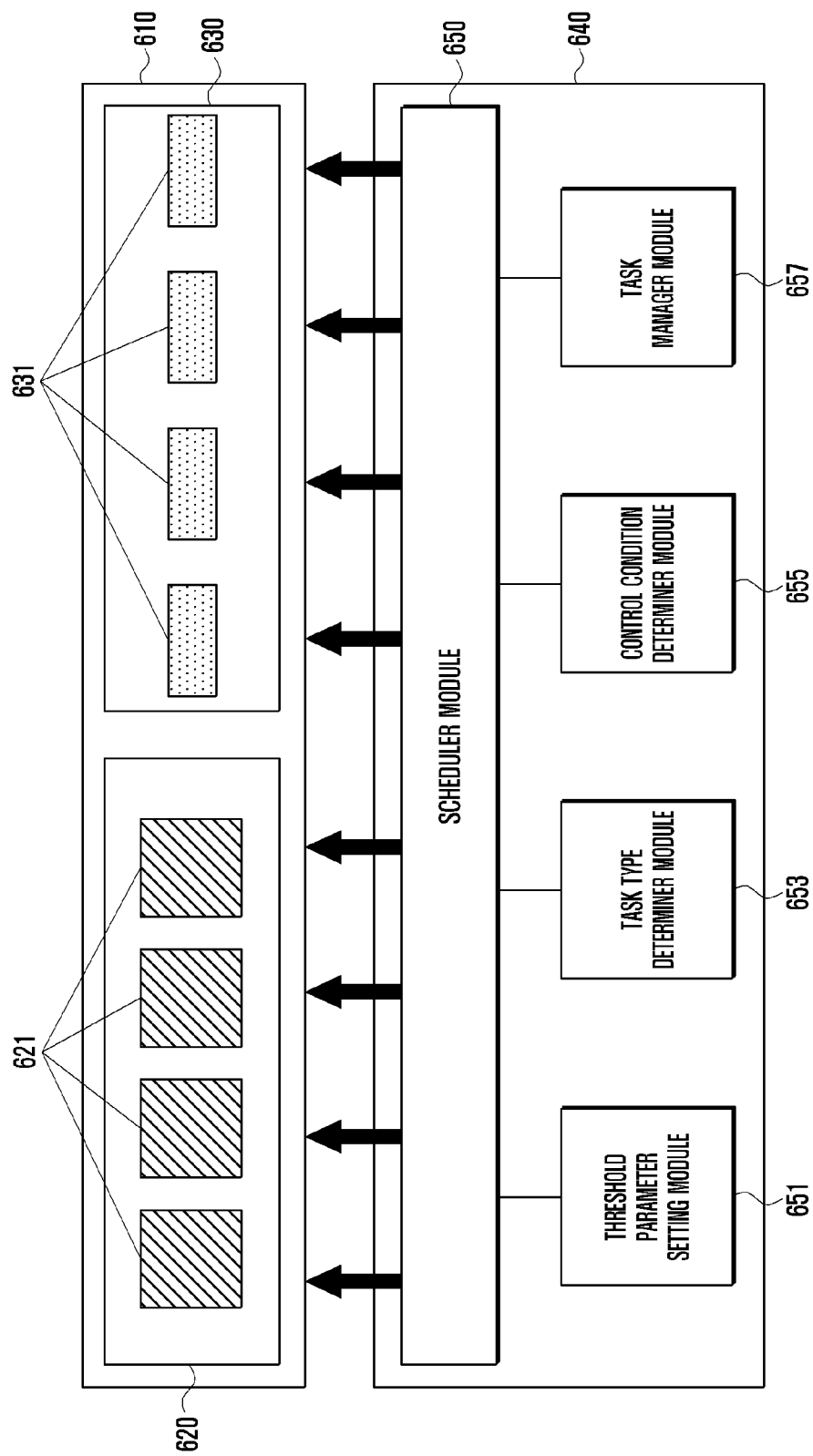
FIG. 6 is a diagram illustrating a configuration of a multiprocessor system, according to an embodiment of the present invention.

FIG. 6 is a diagram illustrating a configuration of a multiprocessor system, according to an embodiment of the present invention.

Referring to FIG. 6, a multi-core processor 610 (e.g. processor 120 in FIG. 1) includes a first operational unit 620 and a second operational unit 630. A task handling module 640 includes a scheduler module 650, a threshold parameter setting module 651, a task type determiner module 653, a control condition determiner module 655, and a task manager module 657.

The first operational unit 620 includes high-performance big cores 621 (e.g. Cortex-A15), and the second operational unit 630 includes low-power little cores 631 (e.g. Cortex-A7). The first operational unit 620 and the second operational unit 630 may each include cores of the same type. In FIG. 6, each of the first operational unit 620 and the second operational unit 630 includes four cores, and the multi-core processor 610 is an octa-core processor. However, the present invention is not limited thereto.

The scheduler module 650 assigns a task to either the first operational unit 620 or the second operational unit 630. The scheduler module 650 may migrate a task from the first operational unit 620 to the second operational unit 630 or from the second operational unit 630 to the first operational unit 620 based on the load level of the assigned task.

Operations of the scheduler module 650 for controlling the threshold parameter setting module 651, task type determiner module 653, control condition determiner module 655, and task manager module 657 are described in detail in connection with FIG. 2.

The threshold parameter setting module 651 configures threshold parameters for task migration. The threshold parameter setting module 651 receives task type information from the task type determiner module 653 and identifies the threshold parameter corresponding to the task type base on a threshold parameter database. The threshold parameter setting module 651 delivers the identified threshold parameter to the scheduler module 650 so that the threshold parameter is enforced according to the task type. The scheduler module 650 assigns a task to the first operational unit 620 or the second operational unit 630 based on the threshold parameter from the threshold parameter setting module 651.

The task type determiner module 653 determines the type of task based on the task information. For example, the task type determiner module 653 determines the task type according to a workload, an amount of data, a response time, and a runtime. In addition, the task type determiner module 653 identifies a group to which the task belongs and identifies the weighted value given to the group. The task type determiner module 653 notifies the scheduler module 650 of the weighted value corresponding to the task. The scheduler module 650 forwards the weighted value to the control condition determiner module 655, which may then measure the load level of the task.

The control condition determiner module 655 measures a task load level. The control condition determiner module 655 receives a weighted value for a given task from the scheduler module 650. Here, the weighted value may be a numerical value identified by the task type determiner module 653. The control condition determiner module 655 measures the load level of the task based on the weighted value. For example, when the weighted value is relatively large, the load level is also relatively large. The control condition determiner module 655 delivers the load level value of the task to the scheduler module 650. The scheduler module 650 forwards the load level value to the task manager module 657, which may then determine the priority of the task.

The task manager module 657 determines priorities of tasks based on the load level values of the tasks obtained via the scheduler module 650. The task manager module 657 sends the priorities of the tasks to the scheduler module 650. Then, the scheduler module 650 assigns each task to the first operational unit 620 or to the second operational unit 630 based on the task priorities and the threshold parameter from the threshold parameter setting module 651.

Figure 7A:
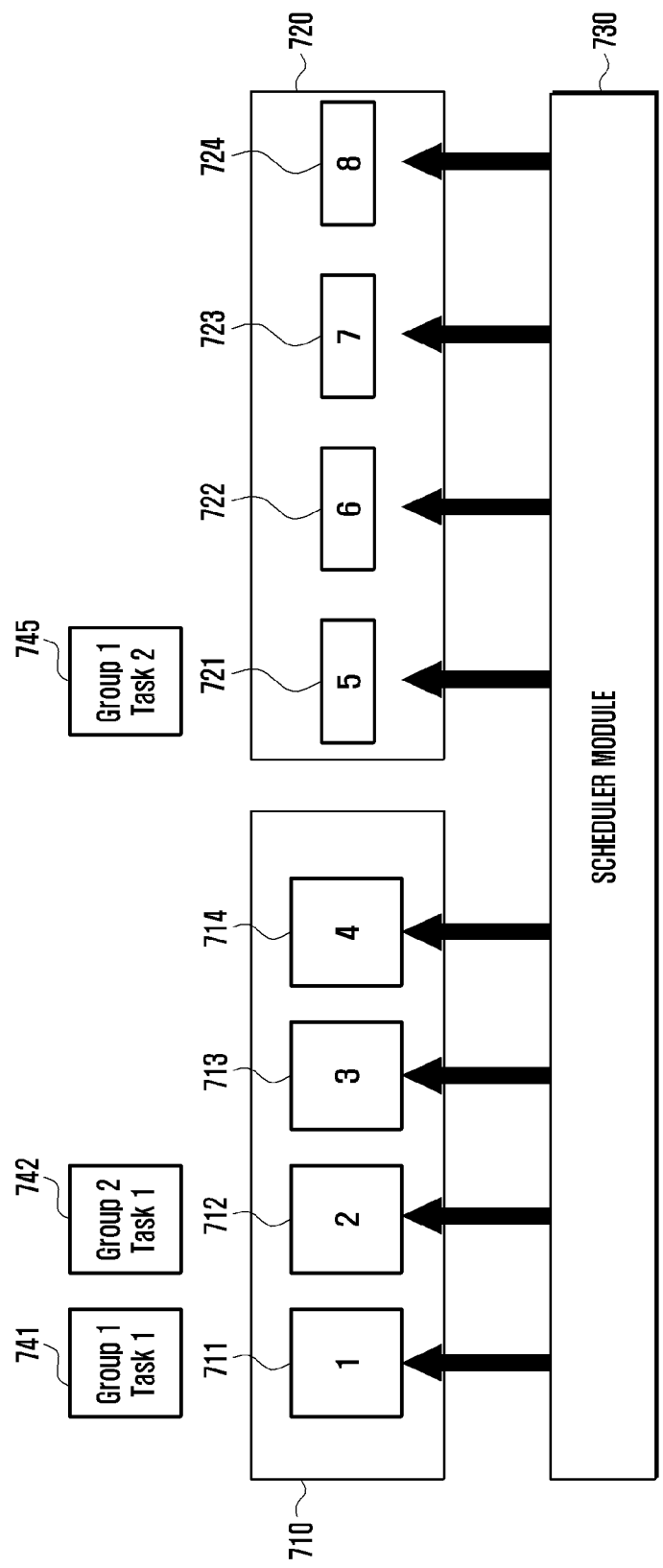
FIGS. 7A and 7B are diagrams illustrating a task migration, according to an embodiment of the present invention.
Figure 7B:
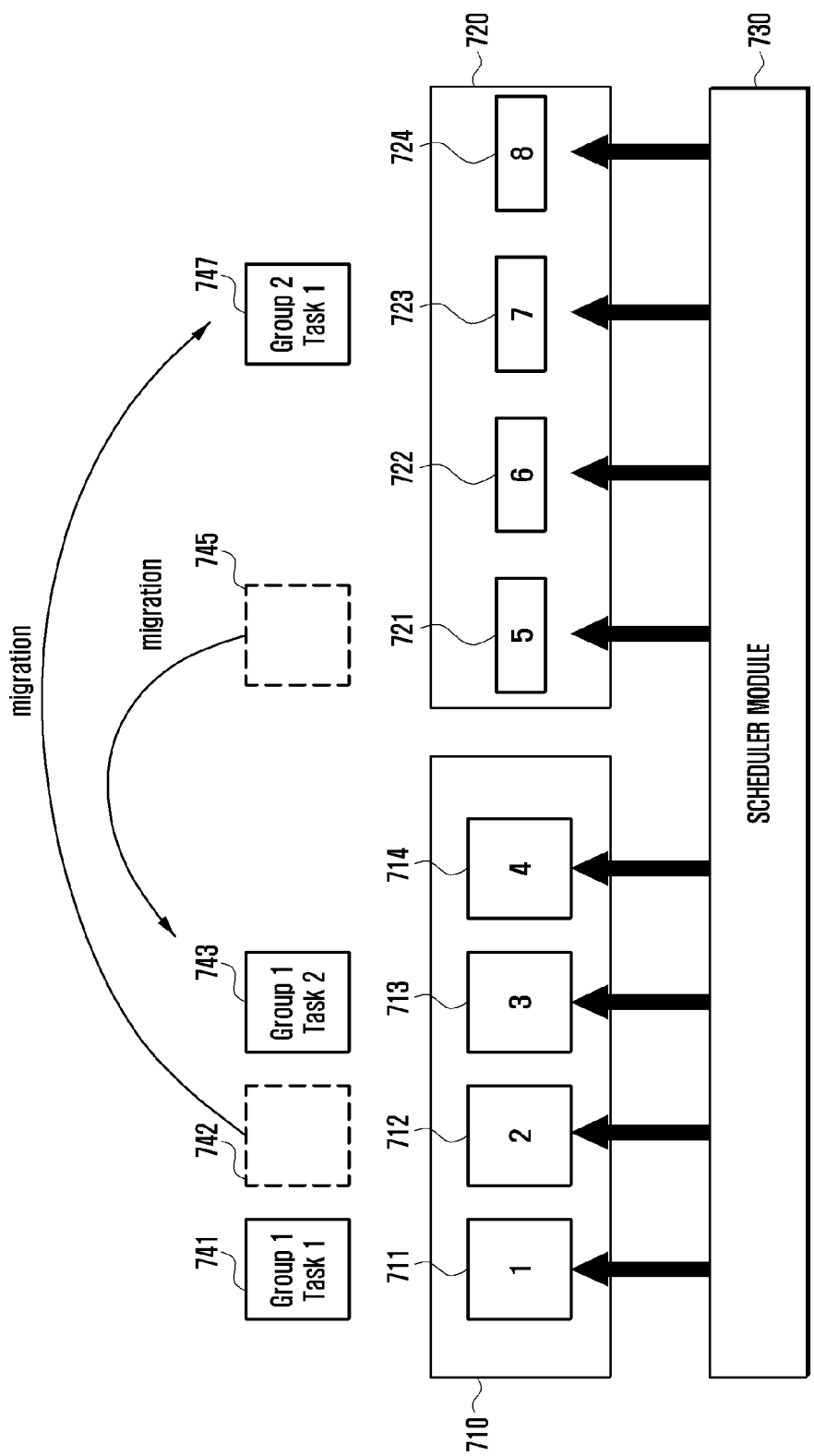

FIGS. 7A and 7B are diagrams illustrating a task migration, according to an embodiment of the present invention.

FIG. 7A illustrates states before task migration in a multiprocessor system environment, and FIG. 7B illustrates states after task migration. In the multiprocessor system environment, the scheduler module 730 assigns each task to one core from among the cores belonging to the first operational unit 710 or the second operational unit 720. The first operational unit 710 and the second operational unit 720 may be formed as a single processor or as independent processors. The first operational unit 710 may include high-performance big cores (e.g. Cortex-A15), and the second operational unit 720 may include low-power little cores (e.g. Cortex-A7).

The scheduler module 730 may be configured to assign a newly obtained task having one or more threads to the second operational unit 720 for execution regardless of task information.

When the load of a task exceeds a threshold load level value, the scheduler module 730 assigns the task to one core of the first operational unit 710 for execution. When the load of a task is less than or equal to the threshold load level value, the scheduler module 730 assigns the task to one core of the second operational unit 720 for execution.

The scheduler module 730 may be configured to migrate, when the load level of a task being executed on one core of the second operational unit 720 exceeds a threshold load level value, the task to one core of the first operational unit 710. The scheduler module 730 may also be configured to migrate, when the load of a task executing on one core of the first operational unit 710 falls below the threshold load level value, the task to one core of the second operational unit 720.

For example, in a multiprocessor system environment shown in FIG. 7A, task 1 (741) of group 1 and task 1 (742) of group 2 are executed on the first operational unit 710. Task 2 (745) of group 1 is executed on the second operational unit 720. A core having an assigned task may be an active core (e.g. core 1 (711), core 2 (712), and core 5 (721)). A core not having an assigned task may be an inactive core (e.g. core 3 (713), core 4 (714), core 6 (722), core 7 (723), and core 8 (724)). As the load level of the task 1 (741) of group 1 exceeds the threshold load level value, task 1 (741) of group 1 may be assigned to one of the cores of the first operational unit 710. As the load level of the task 2 (745) of group 1 does not exceed the threshold load level value, task 2 (745) of group 1 may be assigned to one of the cores of the second operational unit 720.

The scheduler module 730 monitors state changes of the tasks and identifies a priority of the tasks according to task load level changes. The scheduler module 730 determines whether to transfer a task migration based on the identified task priorities.

The load level of the task 2 (745) of group 1 may remain below the threshold load level value for a certain period of time and may, at a later time, exceed the threshold load level value. Here, the threshold load level value may be set in advance by the threshold parameter setting module (e.g. threshold parameter setting module 230 in FIG. 2). The scheduler module 730 determines that the load of the task 2 (745) of group 1 exceeds the threshold load level value. Then, the scheduler module 730 may migrate task 2 (745) of group 1 from core 5 (721) of the second operational unit 720 to core 3 (713) of the first operational unit 710. That is, the scheduler module 730 may migrate task 2 (745) of group 1 from the second operational unit 720 (e.g. low-power processor) to the first operational unit 710 (e.g. high-power processor) based on the load level of task 2 (745) of group 1.

On the other hand, the load of the task 1 (742) of group 2 may remain above the threshold load level value for a certain period of time and may, at a later time, fall below the threshold load level value. The scheduler module 730 determines that the load level of the task 1 (742) of group 2 falls below the threshold load level value. Then, the scheduler module 730 may migrate task 1 (742) of group 2 from core 2 (712) of the first operational unit 710 to core 7 (723) of the second operational unit 720. That is, the scheduler module 730 may migrate task 1 (742) of group 2 from the first operational unit 710 (e.g. high-power processor) to the second operational unit 720 (e.g. low-power processor) based on the load level of the task 1 (742) of group 2.

As shown in FIG. 7B, task 2 (743) of group 1 may be migrated from core 5 (721) of the second operational unit 720 to core 3 (713) of the first operational unit 710. In addition, the task 1 (747) of group 2 may be migrated from core 2 (712) of the first operational unit 710 to core 7 (723) of the second operational unit 720.

At least a part of the apparatus (e.g. modules or functions) or the method (e.g. operations) may be implemented as a computer program, which can be stored in various nontransitory computer readable storage media in the form of a programming module. Instructions of the computer program may be executed by one or more processors (e.g. processor 120). For example, the memory 130 may be a nontransitory computer readable storage medium. At least a part of the programming module may be executed by the processor 210. At least a part of the programming module may include at least one of a module, program, routine, instruction set and process supporting one or more functions.

The nontransitory computer readable storage media may include magnetic media such as a hard disk and floppy disk, optical media such as a CD-ROM and DVD, magneto-optical media such as a floptical disk, and memory devices such as a ROM, RAM and flash memory. The nontransitory computer readable storage media may store program instructions, data files, data structures, and combinations thereof. The program instructions may include instructions developed specifically for the present invention and existing general-purpose instructions. The program instructions may include machine codes produced by compilers and high-level language codes executable through interpreters. Each hardware device may be replaced with one or more software modules to perform operations according to the present invention, and vice versa.

An existing component of a module or programming module may be removed or a new component may be added to the module or programming module. Operations supported by components of a module or programming module may be carried out in sequence, in parallel, by repetition, or heuristically. In a dynamic manner, some operations may be executed in different order or may be skipped, or a new operation may be added.

While the present invention has been shown and described with reference to CERTAIN embodiments thereof, it should be understood by those skilled in the art that many variations and modifications of the method and apparatus described herein will still fall within the scope of the present invention as defined in the appended claims and their equivalents.

What is claimed is:

1. A method for determining task priorities in an electronic device, the method comprising:
   receiving, by a processor of the electronic device, a request to perform a task;
   identifying, by the processor, a type of the requested task;
   identifying, by the processor, a workload corresponding to at least one of a first multi-core processor and a second multi-core processor;
   determining, by the processor, a weighted value corresponding to the task based on the identified type of the task and the identified workload;
   measuring, by the processor, a threshold parameter corresponding to the task based on the identified weighted value; and
   assigning, by the processor, the task to at least one of the first multi-core processor and the second multi-core processor based on the measured threshold parameter,
   wherein the type of the requested task is classified based on one of task characteristics, task classes, task states, and task behaviors, and
   wherein the weighted value is determined based on the workload corresponding to at least one of the first multi-core processor and the second multi-core processor.

2. The method of claim 1, wherein the first multi-core processor includes at least one first core processor and the second multi-core processor includes at least one second core processor having lower performance than the first core processor.

3. The method of claim 2, wherein assigning the requested task to the first multi-core processor comprises assigning the requested task to the at least one first core processor of the first multi-core processor.

4. The method of claim 2, wherein assigning the requested task to the second multi-core processor comprises assigning the requested task to the at least one second core processor of the second multi-core processor.

5. The method of claim 1, further comprising migrating, when the threshold parameter of the assigned task, which has been assigned to the second multi-core processor, is greater than a preset threshold value, the assigned task from the second multi-core processor to the first multi-core processor.

6. The method of claim 1, further comprising migrating, when the threshold parameter of the assigned task, which has been assigned to the first multi-core processor, is less than or equal to a preset threshold value, the assigned task from the first multi-core processor to the second multi-core processor.

7. The method of claim 6, wherein migrating the assigned task comprises moving data of the assigned task to one of a memory and a processor so that the transferred task is capable of continuing its execution after being transferred.

8. The method of claim 1, wherein determining the weighted value comprises:
   identifying a group corresponding to the requested task; and
   determining a weighted value corresponding to the identified group.

9. The method of claim 8, wherein identifying the group comprises:
   classifying the task by type, forming a group corresponding to the classified type of task, and assigning the weighted value to the formed group; and
   identifying the formed group to which a given task belongs.

10. The method of claim 1, wherein the threshold parameter is set differently for different types of tasks.

11. An electronic device comprising:
    a memory; and
    a processor which is electrically connected to the memory,
    wherein the memory comprises instructions, executable by the processor, the processor being configured to:
    receive a request to perform a task,
    identify a type of the requested task,
    identify a workload corresponding to at least one of a first multi-core processor and a second multi-core processor,
    determine a weighted value corresponding to the task based on the identified type of the task and the identified workload, measure a threshold parameter corresponding to the task based on the weighted value, and assign the task to at least one of the first multi-core processor and the second multi-core processor based on the measured threshold parameter, wherein the type of task is classified based on one of task characteristics, task classes, task states, and task behaviors, and wherein the weighted value is determined based on the workload corresponding to at least one of the first multi-core processor and the second multi-core processor.

12. The electronic device of claim 11, wherein the first multi-core processor includes at least one first core processor and the second multi-core processor includes at least one second core processor having lower performance than the first core processor.

13. The electronic device of claim 11, wherein the processor assigns the task to at least one first core processor of the first multi-core processor.

14. The electronic device of claim 11, wherein the processor assigns the task to at least one second core processor of the second multi-core processor.

15. The electronic device of claim 11, wherein the processor is further configured to migrate, when the threshold parameter of the assigned task, which has been assigned to the second multi-core processor, is greater than a preset threshold value, the assigned task from the second multi-core processor to the first multi-core processor.

16. The electronic device of claim 11, wherein the processor is further configured to migrate, when the threshold parameter of the assigned task, which has been assigned to the first multi-core processor, is less than or equal to a preset threshold value, the assigned task from the first multi-core processor to the second multi-core processor.

17. The electronic device of claim 11, wherein the processor is further configured to classify the task by a group based on characteristics of the task.

* * * * *